E. GASE.
AUTOMATIC WEIGHING MACHINE.
APPLICATION FILED DEC. 4, 1920.
1,419,557.
Patented June 13, 1922.
5 SHEETS—SHEET 2.
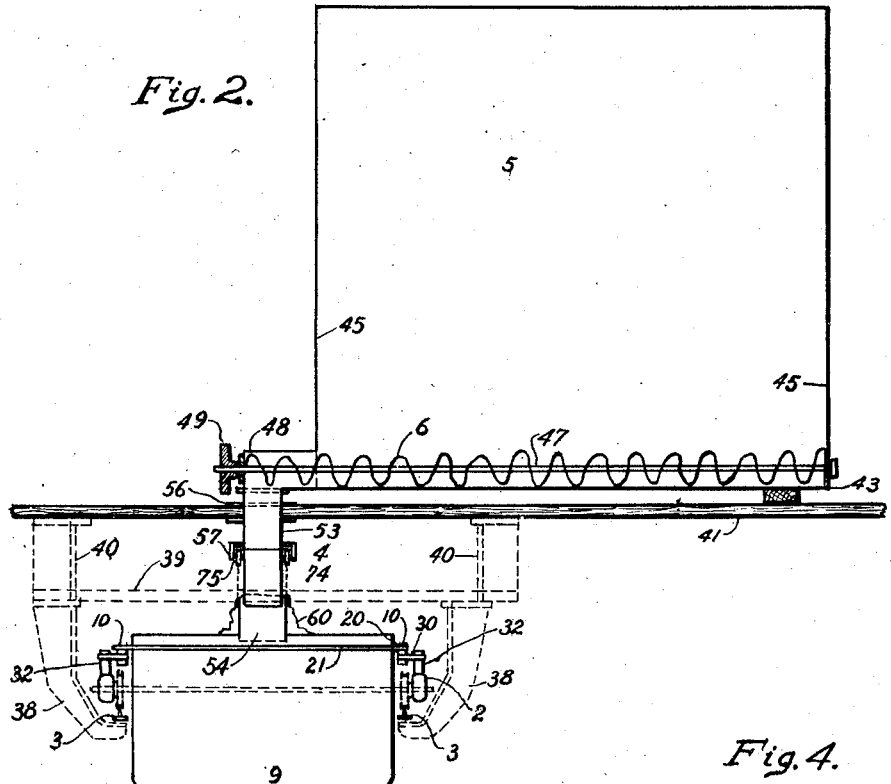
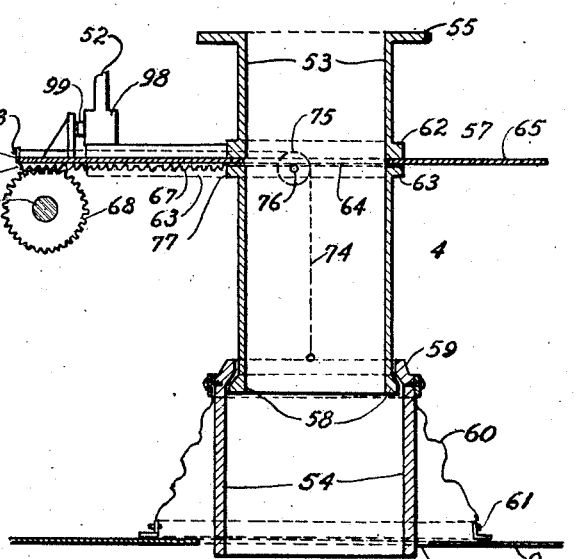
INVENTOR
Eugene Gase

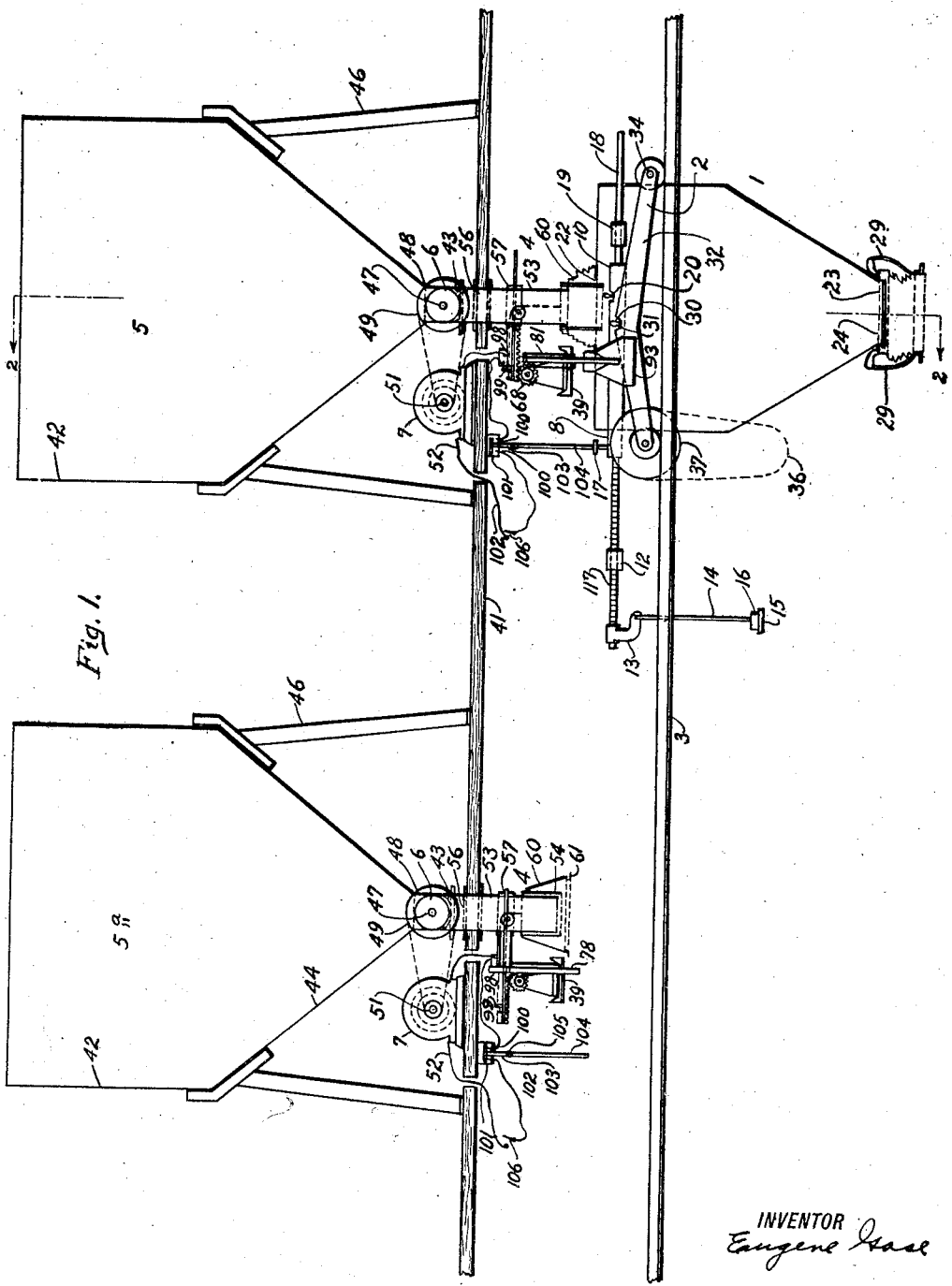

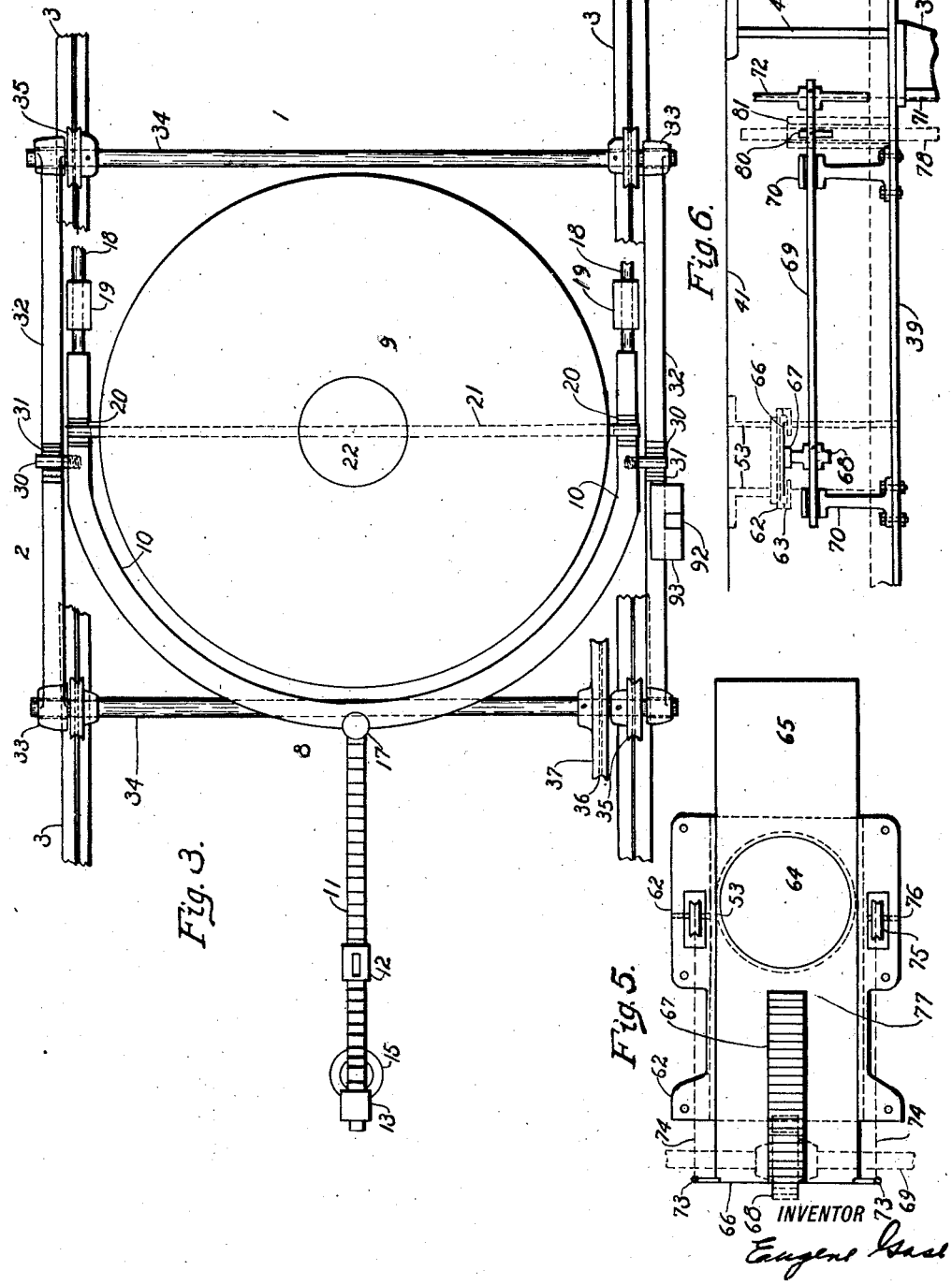

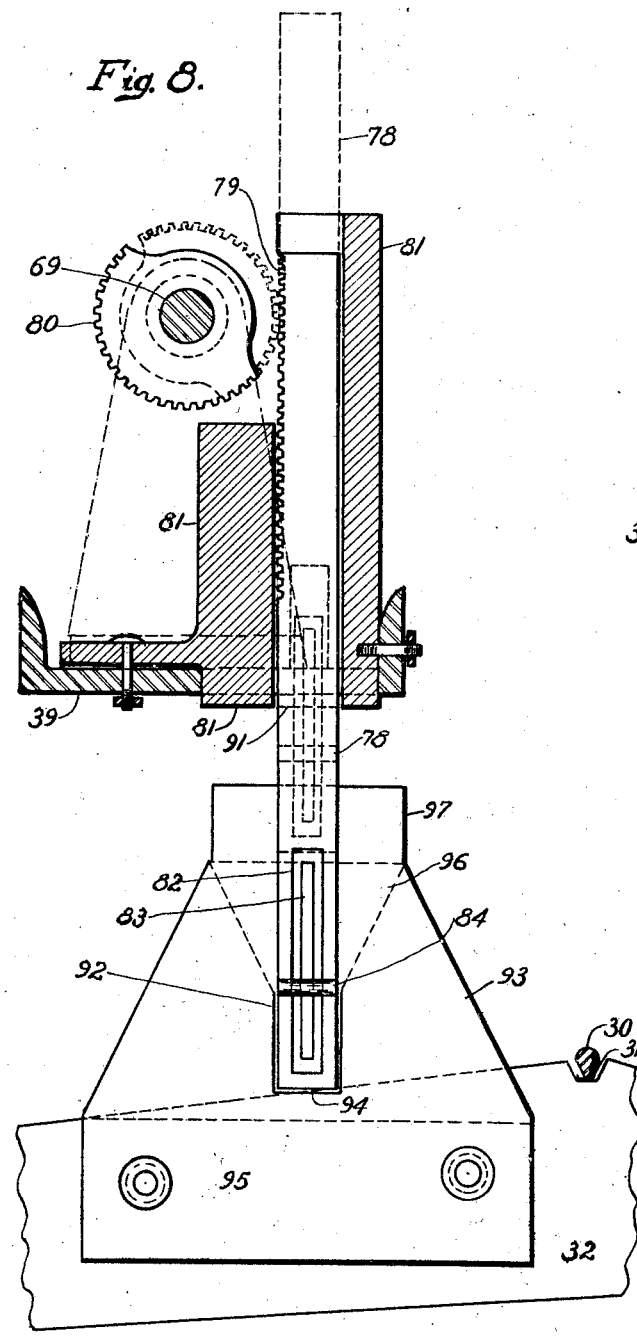
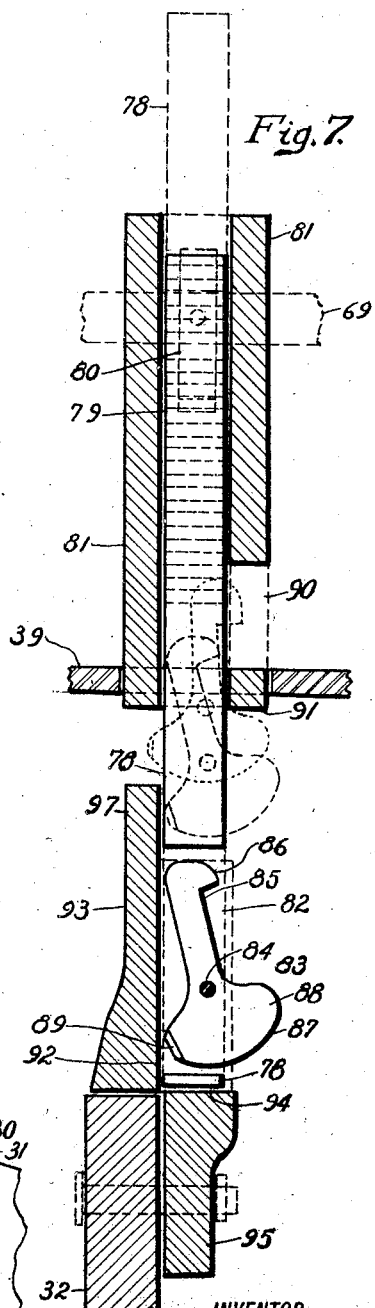

E. GASE.
AUTOMATIC WEIGHING MACHINE.
APPLICATION FILED DEC. 4, 1920.
1,419,557.
Patented June 13, 1922.
5 SHEETS—SHEET 5.
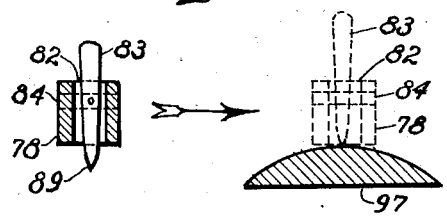
Fig. 9.
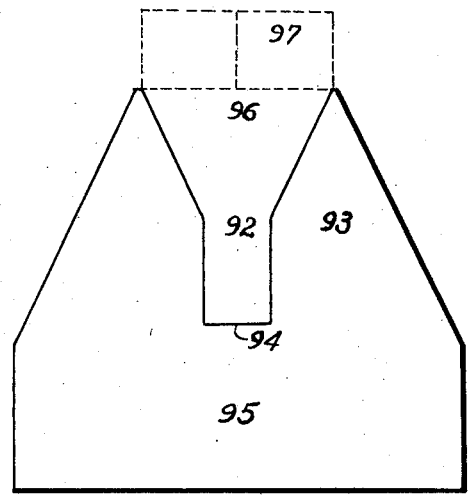
Fig. 10.
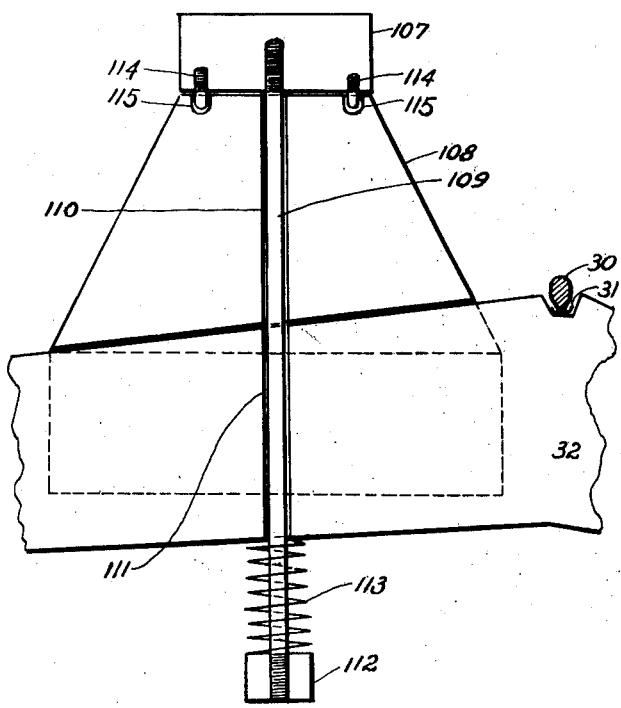
Fig. 12.
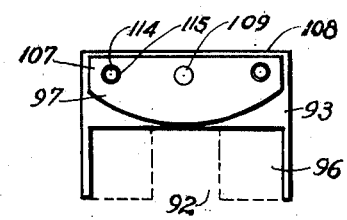
Fig. 11.
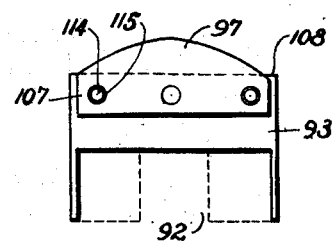
Fig. 11ª
INVENTOR
Eugene Gase

UNITED STATES PATENT OFFICE.

EUGENE GASE, OF SAGINAW, MICHIGAN, ASSIGNOR TO BAKER-PERKINS MANUFACTURING CORPORATION, OF SAGINAW, MICHIGAN.

AUTOMATIC WEIGHING MACHINE.

1,419,557.  Specification of Letters Patent.  Patented June 13, 1922.

Application filed December 4, 1920. Serial No. 428,257.

*To all whom it may concern:*

Be it known that I, EUGENE GASE, a citizen of the United States, residing at Saginaw, in the county of Saginaw and State of Michigan, have invented new and useful Improvements in Automatic Weighing Machines, of which the following is a specification.

This invention relates to automatic weighing machines working in combination with a power driven feeding device and generally employed in bakeries and similar establishments for weighing flour and like materials into mixing and kneading machines and other apparatus used in these industries.

The object of my invention is to make one balance serve for a plurality of store bins supplying the materials to be weighed and for any number of machines in which the weighed materials are used, to place the balance, when transferred to a fresh bin, automatically into its position in regard to the feeding device belonging to this bin, simultaneously therewith and automatically to start its driving machinery, to stop automatically the latter, as soon as the required quantity of the material has entered the weighing hopper of the balance, to prevent any escape of dust on the passage of the materials from the feeding device into the weighing hopper and, after scaling, from the latter into the machine in which they are to be used, and to render the whole operation more efficient, expeditious and economical.

To this end, I provide a track of rails between the store bins and their feeding devices above, supplying the materials to be weighed, and the machines below, receiving the weighed materials, and a wheeled truck easily movable thereon, supporting the fulcrum of the balance and furnished with a lockseat and means to release the device, which, by settling in this lockseat, automatically arrests and locks the truck when the balance thereon is in alignment with the feeding device above.

I usually construct the balance as follows: The scale beam of the balance is furcated, the graduated stem being provided with a sliding weight and the fork carrying near the ends of its branches the weighing hopper receiving the material to be weighed. This hopper is preferably circular in cross section, its upper part being cylindrical and its lower part an inverted truncated cone. The top of the hopper is closed with exception of an opening in its center wide enough for preventing its edges touching the feeding device during the weighing operation. The bottom of the hopper consists of a shutter which is closed while weighing and opened for dropping the weighed material into the machine underneath; for avoiding the escape of dust a canvas tube, as wide as the opening at the bottom of the hopper and sufficiently long to give ample play for the oscillations of the latter, is attached with one end to the frame of the shutter and its other end to a ring having a somewhat larger diameter than that of the charging opening in the top of the machine and furnished with spring hooks, by means of which the ring and tube, drawn up when not in use, are suspended from the frame of the shutter. The upper part of the hopper is provided with two rods projecting radially at opposite points and ending in knife edges which rest in wide V-shaped bearings arranged near the ends of the upper sides of the branches of the furcated scale beam; the points of support of the weighing hopper must be placed so far above its center of gravity that, empty or loaded, it always remains in a vertical position during the oscillations of the balance. The branches of the scale beam are provided at points opposite to each other between the bearings for the weighing hopper and the stem with rods protruding over the rails and ending in knife edges resting in wide V-shaped bearings mounted on the upper sides of the side beams connecting the two axles of the truck outside its wheels; this arrangement makes the balance very sensitive. A pan for receiving weights is suspended from the end of the stem of the scale beam, and the ends of its branches are provided with rods serving as prolongation thereof and carrying sliding counter weights, so that every facility is given for the proper regulation of the balance and its exact weighing. As the stem of the scale beam at one side and the rods attached to its fork at the other side extend over and beyond the two axles of the truck, the balance is prevented from tipping over, while having at the same time ample sway for its work.

The store bins are generally arranged on the floor immediately above that containing the machines in which the weighed materials are to be used; in order to save space, the rails for the balance truck are then supported by brackets fixed to the ceiling between the two floors and arranged in such a manner that there is ample room for the free passage of the balance, its hopper and appendages. The materials to be weighed are fed from each store bin into a chute or feeding tube passing through an opening in the ceiling at a point for its outlet to be in alignment with the opening in the weighing hopper, when the balance truck is stopped underneath by the automatic device.

The store bins form preferably, especially when used for flour, in their upper part an oblong box and have a half circular bottom in which a screw conveyer transporting the material to the chute or feeding tube rotates; the two sides of the upper part of the bin which are parallel to the axis of the conveyer, slant downwards towards the circular bottom part, while the two other sides are vertical to this axis. The conveyer is usually driven by a small electric motor placed alongside the bin.

The feeding tube, which I consider the most convenient for the passage of the material from the conveyer into the weighing hopper, is circular and telescopic; its upper part is stationary, fixed with its upper end to the outlet of the conveyer and carried by flanges supported by the ceiling; its lower movable part slides telescopically on the lower half of the stationary part. When weighing is to be done, the sliding part of the feeding tube is lowered, entering somewhat into the interior of the weighing hopper through the opening in its top, and, after its completion, raised again for the removal of the balance. In order to prevent the escape of dust through the circular interstice between the edge of the opening in the top of the hopper and the telescopic tube passing therethrough, the latter is surrounded by a wide skirt made of canvas or any other suitable flexible material and fixed with its narrow end to the top of the tube and with its wider end to a metal ring of somewhat larger diameter than that of the opening which it surrounds. The flexible skirt must be of sufficient length to give ample play for the oscillations of the weighing hopper during weighing; as during this time the weight of the latter is increased by the weight of this device resting thereon, they must be counterpoised together when regulating the equilibrium of the empty balance. The upper half of the stationary part of the feeding tube is provided at a point higher than the limit, to which the sliding part of the same can be raised, with a gate valve which is only opened for the weighing operation. The shutter of this valve consists preferably of a plate somewhat longer than three times the diameter of the bore of the stationary tube and having in its center an opening corresponding to the bore of the latter; the solid part at one side of this opening serves for closing the valve, and that at the opposite side is fitted with a rack for working the same. The rack meshes with a pinion rigidly mounted on a shaft rotatably carried by stationary supports and worked by hand, usually from below by means of a sprocket wheel fixed to the shaft and an endless chain. Flexible, but inelastic means, as chains, wires or the like are attached—one at each side—to the outer end of the latter part—the rack part—of the shutter, stretch alongside the same to sheaves rotatably mounted in brackets arranged at opposite sides of the frame of the valve and then turn downwards to the upper rim of the sliding tube to which they are connected, carrying thus the weight of this tube. The length of these wires is such that, when the rack is moved toward the feeding tube, until the opening of the shutter is in alignment with the latter, and at the same time the sliding tube in its proper low position for charging the weighing hopper, they are perfectly taut, so that, when the valve is closed again, the sliding tube is raised at the same time out of the way of the balance; the distance of the lower end of the stationary part of the feeding tube above the top of the weighing hopper must be—of course—arranged in accordance with the extreme limits within which its sliding part can be moved. I construct the latter, which is usually made of cast-iron, so heavy that its weight easily overcomes any friction and other resistance against the opening of the valve, which renders it necessary to lock its shutter when in the closed position. For this purpose I use the same automatic device, which serves for stopping and locking the balance truck in its proper position underneath the feeding tube, in such a manner that simultaneously with this action the shutter is released and the valve opened by the weight of the descending telescopic tube.

The automatic locking device, which I preferably employ, consists of a square bar of steel, the lockbar, provided at its upper part with a rack meshing with a sector gear fixed to the shaft carrying the pinion working the shutter of the gate valve, and in its lower part with a slot arranged in a plane parallel to the rack and containing the pawl serving as catch. The latter is rotatably suspended in its middle part, considerably above its center of gravity, from a small shaft fixed to the side walls of the slot. The lighter, upper half of the pawl is shaped as a straight slender neck ending in a beaklike hook projecting from the slot, when the freely swinging pawl is in its equilibrium; the combined width of the neck and hook is less than that of the lockbar. The heavier, lower half of the pawl has the shape of a broad leaf, half circular in circumference at its bottom edge and curving upwards towards its center and neck, both sides protruding from the slot when the pawl is in equilibrium. The upper part of the lockbar is enclosed and moves up and down in a stationary guide tube of corresponding shape, which has in the side wall, opposing the rack, an ample opening for the sector gear to be able to grip into its teeth and in the side wall, opposing the hook of the pawl, a slot suitable for the hook to enter, to catch on its bottom wall and thus to suspend the lockbar therefrom. A lockseat adapted to receive the lower end of the lockbar, when released from this position, is fitted at a convenient place to one of the side beams of the balance truck and provided at its upmost end with a trip block adapted to press the opposing lower part of the pawl protruding from the slot in the lockbar inside the same, thereby to draw the hook of the pawl from its seat, and thus to release the lockbar itself. As soon as the teeth of the sector gear are free from the rack of the released lockbar, the latter will drop suddenly by its own weight into the lockseat on the truck. The sector gear meshing with the rack of the lockbar is fixed to its shaft, also carrying the pinion meshing with the rack of the shutter, in regard to the latter in such a position that, when the valve is being closed by turning the shaft and pinion, the section gear raises the lockbar at the same time until, as soon as the valve is completely shut, the hook of the pawl catches on its seat underneath the slot of the guide tube, and, pressed down on the same by the weight of the sliding part of the telescopic feeding tube, locks not only the gate valve in its closed position, but also the lockbar at a point where it is free from the lockseat, but ready to be released by its pawl encountering again the trip block on the balance truck. In case the truck with the balance is to be passed by a bin and feeding device without using them, the release of the pawl can be avoided by lifting it out of the way of the trip block, for which purpose the slot for the pawl hook as well as the closing and rack parts of the shutter must be made so much longer as to give sufficient play for this movement. In cases where it is desirable to avoid this manipulation, I construct the trip block so that it can be easily turned out of the way of the pawl and put into its place again, when needed.

For starting the electromotor driving the conveyer for the material to be weighed, I place a push button starter on the frame of the gate valve and means for actuating this starter, as a small plate or rod, on the rack part of the shutter at such points that, as soon as the valve has been fully opened, the actuating device strikes the button and, thereby closing the electric circuit, starts the motor; thus, the valve being opened by the descending sliding part of the telescopic tube, and its descent being a consequence of the release of the lockbar, the hook of the pawl, when removed from its seat by the trip block, also sets the conveyer to work as soon as it is needed for weighing. In order to stop the motor as soon as the weighing operation has been finished, I mount on the stem of the scale beam a small plate or the like and arrange vertically above the same a stationary switch kept closed by the weight of a rod, the trip rod, suspended therefrom, and opened when the latter is raised out of contact by the above plate ascending with the stem of the scale beam in consequence of the weighing hopper having received the quantity of material to be scaled off. In order to prevent the motor from being restarted by the rod descending and closing the switch again, when the weighing hopper is discharged, either the gate valve in the feeding tube must be closed before doing so, whereby the actuating device on the shutter is removed from the starter on the valve and the circuit thus definitely broken, or a third stationary switch must be arranged, which is closed, when it is desired to start the weighing operation in regard to the bin to which the motor controlled by the switch belongs, and opened simultaneously with the raising of the trip rod and opening of its switch, when the duly charged hopper causes the ascension of the stem of the scale beam. In case electricity is not used as the motive power for driving the conveyer, well known toggle devices may be employed to work a sliding clutch arranged on the driving shaft and adapted to grip into the driving pulley revolubly mounted thereon; the clutch is thrown in and the shaft rotated by means of the shutter of the gate valve being opened by the weight of the released sliding part of the telescopic tube; the clutch is removed from the driving pulley and the conveyer stopped by means of the upward movement of the stem of the scale beam.

The accompanying drawings serve for more fully explaining the novel features and devices and the working of my invention, the feed conveyer in the example illustrated being worked by electricity.

Fig. 1 shows the general arrangement of my automatic, travelling weighing machine and the bins and feeding devices supplying the material to be weighed therein, the balance and the various locking devices and switches being represented in the position which they take up at the moment, when the weighing hopper of the balance has received the required exact amount of the material to be weighed.

Fig. 2 is a cross section on line 2—2 of Fig. 1, passing through the scale, feeding tube, conveyer and bin and showing in dotted lines the support of the moving gear for the shutter and the lockbar-rack, and the brackets carrying this support and the rails on which the balance truck travels.

Fig. 3 is a top view of the balance in its position relative to the truck and rails.

Fig. 4 is a vertical section of the telescopic feeding tube showing its sliding part let down and projecting into the weighing hopper of the balance and its stationary part with the gate valve open; Fig. 5 is a plan of the latter in the same position.

Fig. 6 represents a vertical section of the moving gears for the shutter of the gate valve and for the lockbar as arranged on their support.

Fig. 7 is a vertical section—in a plane vertical to the truckbeams and rails—of the lockbar, its guide tube, and the lockseat, the three main positions of the bar and its pawl being shown in uninterrupted, broken and dotted lines respectively.

Fig. 8 is a vertical section—in a plane parallel to the truckbeam and rails—of the lockseat, the lockbar, its guide tube and the sector gear working the bar.

Fig. 9 demonstrates the relative position of the trip block of the lockseat to the pawl of the lockbar.

Fig. 10 is a vertical section of the lockseat in a plane parallel to the truckbeam, showing the channel into which the lockbar descends after its pawl has been tripped.

Fig. 11 represents the movable trip block in its active and Fig. 11ª in its inactive position.

Fig. 12 is a vertical section through the movable trip block, the lockseat and the truckbeam, showing its working gear.

Like numerals of reference indicate in all figures like parts serving the same or a similar purpose.

The reference numeral 1 indicates the balance, 2 the truck on which it rests, and 3 the rails on which the truck 2 travels. The materials to be weighed are fed into the balance 1 through the feeding tubes 4 from the bins 5, respectively 5ª, by means of the screw conveyers 6 driven by the electromotors 7.

The balance 1 consists of the furcated scale beam 8 and the weighing hopper 9 suspended between and from the branches of the fork 10 of the scale beam 8. The stem 11 of the latter is graduated and provided with the sliding weight 12 and at its end with the hook 13 from which the rod 14 is suspended, carrying the disklike pan 15 for receiving loose weights 16; the top of the stem 11 has mounted thereon by means of a small rod the disc 17 serving as interruptor of the electric current, when the hopper 9 has been charged with the required weight and consequently the stem 11 rises. Each of the branches of the fork 10 is fitted at its end with a rod 18 on which a counter weight 19 slides, and near its end with a V-shaped bearing 20. The bearings 20 support the ends formed as knife edges of the rod 21 carrying the weighing hopper 9 which thus is able always to maintain its upright position. The hopper 9 is provided in the center of its top with the opening 22 through which it is charged, and at the botttom of its lower cone like part with the flange 23 serving as frame for the sliding shutter 24 worked by hand and opened, when the hopper 9 is to be emptied. To the flange 23 one end of the canvas tube 25 is fixed, while its other end is attached to the ring 26 fitting over the charging opening 27 in the top 28 of the machine receiving the material weighed in the balance 1; spring hooks 29 serve to suspend the ring 26 with the folded tube 25 from the flange 23, when they are not in use. When unfolded as in Fig. 2, this device prevents the escape of dust during the passage of the material from the hopper 9 into the machine. The fulcrum of the balance 1 is formed by the knife-edged ends of the small rods 30 fixed to the sides of the branches of the fork 10 resting on the V-shaped bearings 31 mounted on the top of the side beams 32 of the truck 2. The side beams 32 are provided at each end with bearings 33, in which the axles 34, to each of which two wheels 35 adapted to run on the rails 3 are fixed, rotate. The truck 2 is propelled by hand by means of the continuous chain 36 and the sproket wheel 37, rigidly mounted on one of the axles 34 inside the rails 3. The side beams 32, the bearings 31 thereon, the axles 34 and the rails 3 are so arranged that the weighing hopper 9 has ample play between them, the axles 34, above which the stem 11 of the scale beam 8 at one side and the rods 18 at the opposite side oscillate, serving thus as safeguards against the balance 1 being unduly upset. The rails are carried by the brackets 38 bolted to the channel iron 39 forming the support for the moving gear of the shutter and lockbar, which are minutely described later on, and fixed by the brackets 40 to the ceiling 41.

Each of the bins 5 and 5ª consists of the wide, oblong upper part 42 and of the narrow half-cylindrical bottom part 43, which are connected by the middle part formed by the side walls 44 slanting towards and the side walls 45 (Fig. 2) vertical to the bottom part 43. The bins 5 and 5ª are supported by the stanchions 46.

The screw conveyer 6 is arranged with its shaft 47 coaxially to the half-cylindrical bottom part 43 of the bin and extends throughout its whole length, protruding at one side into the boxlike chute 48 connected with its open bottom to the feeding tube 4. The conveyer 6 is worked by means of the pulley 49 fixed to the end of the shaft 47 protruding from the chute 48 and of the belt 50 from the driving pulley 51 of the electromotor 7, to which the current is supplied by the circuit 52.

The feeding tube 4 is circular in cross section, telescopic and consists of the narrower and longer stationary part 53 and the wider and shorter part 54 telescopically sliding on the lower half 53. The stationary part is fixed by means of the flange 55 to the ceiling, connected by the tube 56 to the opening in the bottom of the chute 48 and provided in its upper half with the gate valve 57 and at its lower end with the flange 58. The sliding tube 54 has at its upper end the flange 59 the inner inclined surface of which corresponds to the outer inclined surface of the flange 58, and is surrounded by the skirt like tube 60 made of canvas, fixed with its upper and narrower end to the flange 59 and with its lower and wider end to the ring 61 which has a slightly wider diameter than the opening 22 in the top of the weighing hopper 9. The canvas skirt 60 with its ring 61 serves for preventing dust from penetrating into the surrounding atmosphere, while the weighing hopper 9 is being charged, and must be of such a length as to allow ample play for the oscillations of the latter during the operation, and, when after its completion the sliding tube is raised, to be out of the way of the balance passing underneath. As mentioned above, this device must be taken into account when fixing the equilibrium of the empty balance.

The flange like body or frame of the gate valve 57 is formed by the two halves 62 and 63 between which, in grooves provided therein, the oblong shutter consisting of the middle part 64, containing an opening of the same diameter as the bore of the stationary tube 53, and of the solid end parts 65 and 66, both somewhat longer than the diameter of the opening in 64, easily slides. The upper half 62 of the valve is bolted to or forms one piece with the upper part and the lower half 63 with the lower part of the stationary tube 53. The end part 65 of the shutter serves for closing the tube 53 when not in use, and the end part 66 is furnished at its underside with the rack 67 meshing with the pinion 68 rigidly fixed to the shaft 69 revolving in bearings arranged in the uprights 70 bolted to the channel iron 39. The rack 67 and thereby the shutter are worked by rotating the shaft 69 by hand by means of the chain 71 running over the sprocket wheel 72 rigidly mounted on the shaft 69. The end part 66 is provided with two hooks 73, one at each side of its end, carrying wires 74 running along the sides of the upper half 62 of the valve frame, over sheaves 75 loosely mounted on small shafts 76 fixed in brackets formed in the lower half 63 of the frame and downwards to hooks fixed to the flange 59 of the sliding tube 54. The wires 74 are tighly stretched, when the sliding tube 54 which they carry, is at its lowest point, its seat on the flange 58, and the opening 64 in the shutter is in complete alignment with the tube 53, ready for the weighing operation. The rack 67 of the shutter and the pinion 68, working the same and the exact position of which also governs those of the shaft 69, the uprights 70, the channel iron 39 and the brackets 40, are so arranged, that, when the shutter is drawn open by the weight of the sliding tube 54 until the latter rests on its seat 58, the rack 67 simultaneously reaches the stop 77 limiting its movement towards the stationary tube 53, and that, when the rack is moved away from the tube 53 in order to close the latter by the part 65 of the shutter, it can be done to an extent somewhat greater than is absolutely necessary for this purpose, in order to give to the catch of the device keeping the shutter in the closed position sufficient play for its advantageous manipulation. This device, which serves at the same time for arresting the truck 2, when it arrives in the position in which the opening 22 in the top of the weighing hopper 9 of the balance 1 thereon is in proper alignment with the feeding tube 4 for the weighing operation, and for locking the same in this position, consists of the lockbar 78 fitted at its upper end with the rack 79 meshing with the sector gear 80 fixed to the shaft 69, on which also the pinion 68, working the shutter rack 67, is mounted.

The lockbar 78, preferably a square steel bar, moves in the guide tube 81 fixed with its lower end in a corresponding opening of the channel iron 39 and cut away at the side pointing toward the sector gear 80 for allowing the latter to grip into the teeth of the rack 79. The lower part of the lockbar is provided in a plane parallel to that of the rack 79 with the slot 82 in which the pawl 83 freely oscillates on the small shaft 84 fixed in the side walls of 82. The pawl 83 is composed of the long narrow neck 85 ending side-wise in the hook 86, projecting, when the pawl 84 is in equilibrium, outside from the slot 82, and of the leaf- or disc-like part 87 semicircular in its lower end and made up of a thicker, larger and heavier half-round part 88 pointing in the same direction as the hook 86, and by a smaller, considerably thinner and lighter angular part 89 pointing in the opposite direction to that of the hook 86. The weight is distributed on the described several parts of the pawl in such a way that, when in equilibrium, its neck 85 is vertical and its two lower parts 88 and 89 protrude out of the slot 82 over the sides of the lockbar 78. The neck 85 and hook 86 have a combined width smaller than that of the slot 82, which—of course—is identical with that of the lockbar 78, and are shaped at the top so that they easily enter the lower end of the guide tube 81, when the bar 78 is moved upwards. The guide tube 81 is provided with the slot 90 wide enough for the hook 86 of the pawl 83 easily to pass into and out of the same; that part of the tube 81, forming the bridge 91 beneath the slot 90 on which the hook 86 rests, must be made especially strong, as it has not only to carry the weight of the tube 54 and the bar 78, but also must sustain the shocks each time the hook 86 is forced down thereon. At the assemblage of the apparatus, the lockbar 78 is placed in such a position that its pawl 83 oscillates in a plane vertical to the direction of the movement of the balance truck 2, and that the hook 86 of the pawl points away from this line of movement towards the slot 90.

For locking the truck 2 in the proper position for the weighing operation to take place, the lockbar 78 must enter the channel 92 in the lockseat 93 and settle on its bottom 94. The lockseat 93 is fixed on the side beam 32 of the truck by means of the bracket 95 forming one piece with 93 and bolted to the side of 32. The channel 92 surrounds closely three sides of the lockbar 78, and the entrance of the latter into the former is facilitated by the wide mouth 96 formed by the sides of 92 slanting upwards to the ends of the trip block 97 which constitutes the top of the lockseat 93 and is shown in Figs. 7, 8 and 10 as forming one piece with the same. The surface of the trip block 97, pointing away from the truck 2 towards the lockbar 78 and intended to act upon the lower part 89 of the pawl 83 for releasing its hook 86 from the bridge 91, is—in order to facilitate this action—curved, the highest point of the curve being in line with the center of the inner wall of the channel 92. The lockbar 78 with its pawl 83, the lockseat 93 and the trip block 97 are arranged in such a position to each other, that, when the truck 2 with the lockseat 93 thereon is drawn towards the lockbar 78 and its pawl 83, the part 89 of the latter is pushed by the trip block 97 backwards into the slot 82; thereby the neck 85 of the pawl is moved in the opposite direction, and its hook 86 is dislodged from the bridge 91; consequently the bar 78 descends into the channel 92 of the lockseat 93, while by the same means and at the same time the sliding tube 54 is released and opens the gate valve 57. In Fig. 7 and Fig. 8 the pawl 83 is drawn in uninterrupted lines, when the lockbar 78 rests on its seat 94, and in broken lines in the moment, when, the lockbar being raised, the hook 86 is ready to turn into the slot 90 and slip over the bridge 91.

In order to start the electric motor 7 driving the screw conveyer 6 simultaneously with the opening of the gate valve 57, I attach to the top of the upper half 62 of its frame a push button starter 98, included in the circuit 52, and to the top of the rack part 66 of the shutter a plate 99 or the like means capable of actuating the starter 98, at points where the latter must be acted upon by the former as soon as the gate valve has been completely opened, while the current is interrupted, when the plate 99 is removed from the starter 98 by the valve 57 being closed. Thus, the release of the pawl 83 by the trip block 97 automatically locks the balance truck 2 in its proper position by the descending lockbar 78, opens the valve 57 of the feeding tube 4 by the release of the sliding tube 54 and starts the conveyer 6 feeding the material into the weighing machine, as soon as the valve 57 has been opened.

For arresting the further supply of material to the weighing hopper immediately after it has received the due weight thereof, the electric motor 7 is stopped at this moment by the automatic opening of the switch 100. The latter is contained in the housing 101 fixed to the ceiling 41 vertically above the disc 17 mounted on the graduated stem 11 of the scale beam 8. As long as the stem 11 remains lowered in consequence of the weights placed thereon exceeding the weight of the material in the weighing hopper 9, the switch 100 is kept closed by the small disc like plate 102 mounted on the top of the short rod 103 sliding easily in a stuffing box arranged in the bottom of the housing 101, and connected to the trip-rod 104 by the hinge 105 which latter is necessary for preventing the device from being damaged by the rod 104 encountering any parts of the balance 1, while passing underneath. The rods 103 and 104 are together of such a length, that, as soon as the hopper 9 has received the amount of material for the balance to be in equilibrium and consequently the stem 11 rises, the disc 17, pushing against the lower end of the rod 104, lifts the latter, the rod 103 and the disc 102 and thus opens the switch 100 and breaks the current to the motor.

After the weighing has thus been finished, the gate valve 57 is immediately closed by turning the wheel 72 accordingly and thereby the lockbar 78 raised free from the lockseat 93, whereafter the truck 2 with the loaded balance is at once removed to the machine, in which the weighed material is to be used. The hook 86 of the pawl 83 settles then down on the bridge 91, and the feeding and automatic devices are ready for the next weighing.

In the frequent cases in which the machine receiving the weighed material is situated underneath the store bin for the same and therefore also directly below the travelling balance when in use, as is Fig. 2, it is more expedient to keep the latter locked in its place after the completion of the weighing operation, thereby leaving the gate valve 57 open and the push button starter 98 in touch with its actuator 99; when the weighing hopper then becomes lighter by being discharged, the disc 17 will descend with the stem 11; the switch 100 would thus be closed again and the motor 7 restarted; for avoiding this occurrence, I employ means to definitely interrupt the electric current simultaneously with the opening of the switch 100. For this purpose I preferably arrange at a convenient place in the circuit 52 a third switch 106 which is closed as soon as weighing is to begin, thus making it possible to start the motor by the starter 98, and opened simultaneously with the interruption of the current by the opening of the switch 100, thereby putting the automatic electric devices out of action.

According to the description the pawls 83 of the lockbars 78 belonging to bins not in use are always in the position to be released by the trip block 97 forming one piece with the lockseat 93, when the balance truck 2 passes underneath; if during this time the feeding devices attached to these bins are not to be disturbed, either the pawls or the trip block must be moved out of the other's way. In Figs. 7 and 8 the slot 90 in the guide tube 81 is shown of ample height so that the lockbar 78 can be raised sufficiently for its pawl 83 to be placed above and out of the reach of the trip block 97, as is demonstrated by the pawl 83 drawn in Fig. 7 in dotted lines. As mentioned above the closing part 65 and the rack part 66 of the shutter are constructed long enough that a somewhat farther drawing out of the same, naturally coinciding with the raising of the hook 86 of the pawl above its seat 91, does not interfere with the proper closing of the gate valve 57. This lifting of the pawl above its seat, which will voluntarily occur at the closing of the valve at the end of each weighing operation, forms a simple way of keeping it from interference by the trip block. But it often happens that a greater number of bins and feeding devices are to be passed by, when the necessary frequent repetition of the raising and lowering of the lockbar would become tedious and inconvenient. In these cases I preferably construct the trip block separate from the lockseat and provide means to move it out of the way of the pawl. Figs. 11, 11ª and 12 represent an example of the construction of a movable trip block. In order to give to the same a firm seat and room to turn, its back 107 and the upper back part 108 of the lockseat 93 are reenforced. The rod 109 is rigidly fixed in the center of the back part 107 of the trip block 97 vertically to its underside and turns and slides easily in the corresponding vertical holes 110 and 111 provided in the back part 108 of tht lockseat and in the side beam 32 respectively. That part of the rod 109 protruding from underneath the beam 32 is provided at its end with an angular nut 112 suitable to be worked by an ordinary long-stemmed key, and surrounded between the nut 112 and the underside of 32 by the spring 113 pressing the bottom of the trip block 97 against the top of the lockseat 93. Pins 114 fixed to the underside of the back part 107 and corresponding to recesses 115 in the top of the lockseat serve to secure the trip block as well in its active position shown in Fig. 11, as in its inactive one represented in Fig. 11ª. The movable trip block is worked by first pushing the rod 109 upwards, until the pins 114 are above the recesses 115, and by then giving the rod a half turn and letting the pins 114 settle down in the recesses 115 opposite to the original ones.

I claim:

1. In a machine of the kind described, the combination with a balance, of a truck supporting the fulcrum of the said balance, of rails for the said truck to run on, of a telescopic feeding chute consisting of a stationary inner tube and a heavy outer tube sliding on the lower half of the former, of a shutter provided in the upper half of the said stationary tube, of flexible, but inelastic means tightly stretched between the said shutter and the top of the said sliding tube in such a manner that the latter, when lowered, keeps in consequence of its weight the former open, and of means for closing the said shutter, thereby raising the said sliding tube at the same time.

2. In a machine of the kind described, the combination with a balance comprising a furcated scale beam and a weighing hopper suspended between its branches, of a truck supporting the fulcrum of the said balance, of rails for the said truck to run on, of a telescopic feeding chute consisting of a stationary inner tube and a heavy outer tube sliding on the lower half of the former, of a shutter provided in the upper half of the said stationary tube, of a seat arranged at the lower end of the latter and serving for the top flange of the said sliding tube to rest on, when lowered so far as to reach into the said weighing hopper, of flexible, but inelastic means tightly stretched between the top of the said sliding tube and the said shutter in such a manner that the latter is kept open by the weight of the former resting on the said seat, and of means for simultaneously closing the said shutter and raising the said sliding tube.

3. In a machine of the kind described, in combination with a balance, of a truck supporting the fulcrum of the said balance, of rails for the said truck to run on, of a telescopic feeding chute consisting of a stationary inner tube and a heavy outer tube sliding on the lower half of the former, of the frame of a gate valve fixed in the upper half of the said stationary tube, of the shutter sliding in the said frame and composed of a middle part containing an opening of the same diameter as that of the said stationary tube, one end part being solid and serving to close the said valve and the second end part being fitted with a rack for working the same, of a seat arranged at the said frame for the said rack to rest against when the said valve is open, of flexible, but inelastic means connecting the outer ends of the rack-part of the said shutter with the top of the said sliding tube, of loose sheaves over which the said flexible, but inelastic means run, of shafts mounted in the said frame and revolubly carrying the said sheaves, the length of the said flexible, but inelastic means being such that, when the said sliding tube is lowered to its position for charging the said balance, its weight keeps the said rack pressed against the said seat on the said frame, of a pinion meshing with the said rack, and of a shaft carrying the said pinion and rotatably mounted in stationary supports.

4. In a machine of the kind described, the combination with a balance comprising a furcated scale beam and a weighing hopper suspended between the branches of the said beam and provided in its top with an opening for charging the same, of a truck supporting the fulcrum of the said balance, of rails for the said truck to run on, of a telescopic feeding chute placed in alignment with the charging opening of the said weighing hopper and consisting of a stationary inner tube and a heavy outer tube sliding on the lower half of the former and reaching, when lowered, into the said charging opening, of a shutter provided in the upper half of the said stationary tube, of flexible, but inelastic means tightly stretched between the said shutter and the top of the said sliding tube in such a manner that the latter, when lowered, keeps in consequence of its weight the former open, of means for closing the said shutter and thereby raising the said sliding tube, of a skirt-like tube made of flexible, dust proof material and fixed with its upper narrower end to the top of the said sliding tube, and of a ring fixed to the wider lower end of the said skirt-like tube and having a somewhat larger diameter than that of the opening in the said weighing hopper, the said skirt-like tube being of such a length, that, when the said shutter is open, the said ring, resting on the top of the said weighing hopper, surrounds the opening therein, and the folded skirt allows ample play for the oscillations of the said hopper, and that, when the said shutter is closed, the said ring and the said skirt-like tube, stretched by the weight of the latter, are lifted with the said sliding tube out of the way of the said balance, when removed and passing by.

5. In a machine of the kind described, the combination with a balance, of a truck supporting the fulcrum of the said balance, of rails for the said truck to run on, a telescopic chute arranged above the said balance for charging the same and consisting of a stationary inner tube and a heavy outer tube sliding on the lower half of the former, a shutter provided in the upper half of the said stationary tube, of flexible, but inelastic means tightly stretched between the top of the said sliding tube and the outer end of the said shutter in such a manner that the former, when lowered, keeps in consequence of its weight the latter open, of means for closing the said shutter and thereby raising the said sliding tube, and of a contrivance adapted, when raised, to lock the said shutter in its closed position and, when lowered, to release the said shutter and at the same time to lock the said truck in a position for the charging opening of the said balance thereon to be in alignment with the said telescopic chute.

6. In a machine of the kind described, the combination with a balance, of a truck supporting the fulcrum of the said balance, of rails for the said truck to run on, of a feeding chute arranged above, of a shutter provided in the said chute, of means for opening the said shutter and retaining it in the open position, of means for closing the same, of an upright movable lockbar, of a stationary tube loosely surrounding the said lockbar, of means for sliding the latter up and down in the former, working jointly with the said means for closing the said shutter, of a catch adapted to retain the said lockbar in its high position, when the said shutter is closed, and thereby to lock the latter, of means for releasing the said catch, and of means attached to the said truck for receiving the lower part of the said lockbar, when descending and thereby locking the said truck in a position, where the charging opening of the said balance thereon is in alignment with the said feeding chute.

7. In a machine of the kind described, the combination with a balance, of a truck supporting the fulcrum of the said balance, of rails for the said truck to run on, of a chute situated above for charging the said balance, of a shutter provided in the said chute, of means for opening the said shutter and retaining it in this position, of stationary supports, of a shaft revolubly mounted in the said stationary supports, of gearing fixed to the said shaft, of gearing meshing with this gearing and attached to the said shutter, of means for rotating the said shaft and thus working the shutter, of a movable lockbar, of a stationary tube for guiding the said lockbar, of a lockseat fixed to the said truck for receiving the lower part of the said lockbar, when descending and thereby locking the said truck in the proper position for the said balance to be charged, of a rack fitted to the said lockbar, of a sector gear meshing with the said rack and fixed to the above named shaft in such a manner, that its teeth, when the said shutter is closed, grip into those of the said rack and thus raise the said lockbar, and, when the said shutter is opened, leave those of the said rack, thus letting the said lockbar drop into the said lockseat, of a catch attached to the said lockbar and adapted to retain the same in its high position, when the said shutter is closed, and thereby to lock the latter, and a trip device arranged at the said truck and adapted to release the said catch, thereby simultaneously unlocking the said shutter and locking the said truck.

8. In a machine of the kind described, the combination with a balance, of a truck supporting the fulcrum of the said balance, of rails for the said truck to run on, of a chute situated above for charging the said balance, of a shutter provided in the said chute, of means for opening the said shutter and retaining it in this position, of stationary supports, of a shaft revolubly mounted therein, of gearing fixed to the said shaft and meshing with gearing attached to the said shutter, of means for rotating the said shaft, of an upright movable lockbar provided with a slot cut in its lower half perpendicularly to the travel of the said truck, of a stationary guide tube for the said lockbar, containing in its lower part a slot corresponding to the slot in the latter, of a lockseat mounted on the said truck for receiving the lower part of the said lockbar, when descending, of a rack fixed to the latter perpendicularly to the travel of the said truck, of a sector gear meshing with the said rack and fixed to the above named shaft in such a manner that its teeth, when the said shutter is closed, grip into those of the said rack and thus raise the said lockbar, and, when the said shutter is opened, leave those of the said rack, thus letting the said lockbar drop into the said lockseat, of a pawl rotatably mounted on a shaft fixed in the side walls of the slot contained in the said lockbar and consisting of a heavier, broad lower part and a lighter narrow neck ending in a hook, the latter and both sides of the said lower part protruding from this slot, when the said pawl is in equilibrium, and the hook of the same catching, when the said lockbar is raised, in the slot contained in the said guide tube and thereby locking the said shaft and the said shutter, as soon as the latter has been closed, and of a tripblock placed on the top of the said lockseat and so arranged as to release the hook of the said pawl when encountering the protruding lower part of the latter, thus simultaneously unlocking the said shutter and locking the said truck.

9. In a machine of the kind described, the combination with a balance, of a truck supporting the fulcrum of the said balance, of rails for the said truck to run on, of a telescopic feeding chute comprising a stationary inner tube and a heavy outer tube sliding on the lower half of the latter and having a top flange, of a shutter provided in the upper half of the said stationary tube, of a seat arranged at the lower end of the latter and serving for the top flange of the said sliding tube to rest on when lowered, of flexible, but inelastic means tightly stretched between the top of the said sliding tube and the said shutter in such a manner that the latter is kept open by the weight of the former resting on the said seat, of a shaft revolubly mounted in stationary supports and worked by hand, of gearing fixed to the said shaft and meshing with gearing attached to the said shutter, of an upright movable lockbar provided with a slot cut in its lower half perpendicularly to the travel of the said truck, of a stationary guide tube for the said lockbar, containing in its lower part a slot corresponding to the slot in the latter, of a lockseat mounted on the said truck and provided with a wide mouth for guiding the said lockbar, when descending, into the narrow channel thereof, of a rack fixed to the said lockbar, of a sector gear meshing with the said rack and mounted on the above named shaft, of a pawl movably arranged in the slot of the said lockbar so as to catch in the slot of the said guide tube, when the said lockbar is raised and the shutter closed, and of a tripblock fixed to the said truck and adapted to release the said pawl, thus causing the said lockbar to descend into the said lockseat and the said sliding tube to open the said shutter by its weight.

10. In a machine of the kind described, in combination with a balance, a truck supporting the fulcrum of the said balance, rails for the said truck to run on, means for moving the said truck thereon, a lockseat and a tripblock mounted on the said truck, a plurality of bins containing the materials to be weighed, and for each bin: a telescopic chute connected thereto and consisting of a stationary inner tube and a heavy outer tube sliding on the lower half of the latter, a shutter provided in the upper half of the said stationary tube, flexible, but inelastic means tightly stretched between the top of the said sliding tube and the outer end of the said shutter in such a manner that in consequence of its weight the former, when lowered, keeps the latter open, gearing to close the said shutter, a movable lockbar provided with a slot in its lower half, a stationary guide tube for the said lockbar, containing in its lower part a slot corresponding to the slot in the latter, gearing for raising the said lockbar, a shaft carrying the said two gearings, one working the said shutter and the other the said lockbar, in such a relation to each other that the latter is in its high position, when the former is closed, stationary supports in which the said shaft is revolubly mounted, and a pawl so arranged in the slot of the said lockbar and so adapted as to catch in the slot of the said guide tube, when the said lockbar is raised, and the said shutter is closed, the lockbars, their pawls and the seats for the latter in the slots of the guide tubes, belonging to the said bins, being so arranged in regard to the said tripblock and lockseat on the said truck, that, when the said tripblock on the passing truck encounters any of the said pawls, the same is released, whereupon its lockbar descends into the said lockseat, and the corresponding shutter is opened by the corresponding sliding tube descending in consequence of its released weight.

11. In a machine of the kind described, in combination with any number of receptacles receiving the weighed materials through an opening in their top, a track of rails placed above the charging openings of the said receptacles, a four-wheeled truck running on these rails, a furcated scale beam comprising a graduated stem, provided with sliding weight and a pan for carrying loose weights, and two branches, a weighing hopper, a rod passing through the said hopper at points well above its center of gravity and ending outside the same in knife edges, wide bearings fitted on the branches of the said scale beam for the said knife-edged rod ends to carry the said hopper, side beams connecting the wheel axles of the said truck and situated outside the track of the said rails, two rods ending in knife edges, one fixed to each branch of the said scale beam between the said bearings and the said stem and extending sidewise over the said side beams, wide bearings provided in the latter to support the said two knife-edged rods, forming thus the fulcrum of the balance, rods fixed to the ends of the branches of the said scale beam, forming prolongations thereof and provided with sliding counter weights, the stem of the said scale beam projecting over one axle, and the said prolongations of its branches over the other axle of the said truck, a lockseat attached to one of the said side beams and adapted to receive a lockbar, and a trip block so arranged at the said lockseat as to release the lockbar from its suspended position and causing it to enter the said lockseat.

12. In a machine of the kind described, in combination with any number of receptacles receiving the weighed materials through an opening in their top, a track of rails placed above the said openings, a truck running on the said rails, side beams connecting the wheel axles of the said truck and situated outside the said rails, a balance comprising a furcated scale beam supported by knife edged rods fixed to its branches on the top of the said side beams and a weighing hopper suspended from between the said branches and between the said rails, a flange serving as frame for a shutter arranged at the bottom of the said hopper, a tube of dust proof, flexible material fixed with one end to the said flange, a ring attached to the other end of the said tube and sufficiently wide to surround the charging opening of the said receptacles, the said flexible tube being of such a length as to allow by its folds, while the said ring rests on the top of the said receptacle during the discharge of the said weighing hopper, for the oscillations of the latter and thus to prevent the escape of dust, spring hooks fixed to the said ring and adapted to grip over the said flange at the hopper bottom and to suspend therefrom the said tube folded up, and a lockseat attached to one of the said side beams for receiving a locking device, when released by a trip block mounted on the said lockseat.

13. In a machine of the kind described, the combination with a balance, of a truck supporting the fulcrum of the said balance, of rails for the said truck to run on, of an upright movable lockbar, of means for moving it upwards, of a lockseat arranged on the said truck and provided in its lower part with a channel surrounding three sides of the said lockbar, when lowered, and with a wide mouth at the upper end of the channel for guiding the said lockbar thereinto, of a pawl capable of keeping the said lockbar above the line of travel of the channel and mouth of the said lockseat, and of a curved trip block fixed to the top of the latter, its curved side facing towards the said pawl and the highest part thereof being in line with the center of the back surface of the said channel, the said pawl and the said trip block being so situated in regard to each other, that the latter releases the former, when encountering the same, and thus causes the said lockbar to descend into the channel of the said lockseat.

14. In a machine of the kind described, the combination with a balance, of a wheeled truck supporting the fulcrum of the said balance, of rails on which the said truck moves, of a plurality of bins containing the materials to be weighed and arranged above the said rails in a position suitable for charging the said balance, when placed underneath, of a lockseat arranged on the said truck, of upright movable lockbars, one for each bin, and each so situated in regard to the bin belonging thereto that, when descending into the lockseat, it locks the truck and the balance thereon in the proper charging position, of means for each of the said lockbars to raise the same, of pawls—one for each lockbar—so arranged as to retain the said bars in their high position, above the line of travel of the said lockseat, of a movable trip block so arranged on the said truck as to be turned either into its active position in which, when encountering one of the said pawls, it releases the same, its lockbar thereupon dropping into the said lockseat, or into its inactive position, in which, when passing by, it leaves the said pawls undisturbed, of means for turning the said trip block either way, and of means for securing it in either position.

15. In a machine of the kind described, the combination with a balance, of a wheeled truck supporting the fulcrum of the said balance, of side beams connecting the axles of the said truck, of rails for the latter to run on, of a plurality of bins containing the materials to be weighed and arranged above the said rails in a position suitable for charging the said balance when placed underneath, of a lockseat having a vertical channel mounted on a side beam of the said truck, of upright movable lockbars, one for each bin, and each so situated in regard to the bin belonging thereto, that, when descending into the channel of the lockseat, it locks the truck and the balance thereon in the proper charging position, of means for each of the said lockbars to raise the same, of pawls—one for each lockbar—so arranged as to retain the said bars in their high position above the line of travel of the said lockseat, of a trip block consisting of an oblong back part and a curved front part and resting on the back part of the said lockseat, of a rod fixed in the center of the back part of the said trip block vertically to its underside and sliding in vertical holes, prepared in the back part of the said lockseat and in the said side beam, of an angular nut fixed to the end of that part of the said rod protruding from the underside of the said side beam, of a spring arranged around this part between the latter and the said nut and adapted to press the underside of the said trip block against the top surface of the back part of the said lockseat, of pins fixed in the former near each end and corresponding recesses in the latter, and of a key suitable to turn and lift the said nut as required.

16. In a machine of the kind described, the combination with a balance, of a truck supporting the fulcrum of the said balance, of rails for the said truck to run on, of a bin containing the material to be weighed, of a telescopic charging tube consisting of a stationary upper part and a heavy lower part sliding on the lower half of the latter, of a shutter provided in the stationary part of the said telescopic tube, of flexible, but inelastic means tightly stretched between the said shutter and the sliding part of the said telescopic tube in such a manner that the former is kept open by the weight of the latter, when lowered into the charging position, of means for closing the said shutter, of means for locking the same in this position, of a power driven transportation device for transferring the material from the said bin into the said telescopic feeding tube, and of a contrivance attached to the said shutter and so adapted as to start the said transportation device, as soon as the said shutter is released from the closed position and opened by the descent of the released sliding part of the said telescopic tube.

17. In a machine of the kind described, the combination with a balance, of a truck supporting the fulcrum of the said balance, of rails for the said truck to run on, of a bin containing the material to be weighed, of a telescopic charging tube consisting of a stationary upper part and a heavy lower part sliding on the lower half of the latter, of a gate valve frame provided in the upper half of the stationary part of the said telescopic tube, of a shutter sliding therein, of flexible, but inelastic means tightly stretched between the said shutter and the top of the sliding part of the said telescopic tube so as to keep the former open by the weight of the latter when lowered into the charging position, of means for closing the said shutter, of means for locking the same in this position, of a conveyer for transferring the material from the said bin into the said telescopic charging tube, of an electromotor driving the said conveyer, of a push button starter arranged to start the said motor and fixed to the said gate valve frame, and of a device capable of actuating the said starter and mounted on the said shutter at such a point that the motor and thus the conveyer are started as soon as the said shutter is released from the closed position and opened by the descent of the released sliding part of the said telescopic tube.

18. In a machine of the kind described, the combination with a balance, of a truck 13 supporting the fulcrum of the said balance, of rails for the said truck to run on, of a bin containing the material to be weighed, of a telescopic charging tube consisting of a stationary upper part and a heavy lower part sliding on the lower half of the latter, of a gate valve frame provided in the upper half of the stationary part of the said telescopic tube, of a shutter sliding therein and composed of a middle part containing an opening equal to the bore of the stationary part of the said charging tube, one solid end part serving to close the latter, and the opposite end part being fitted with a rack, of a pinion meshing with this rack, of a shaft having the said pinion affixed thereto, of stationary supports in which the said shaft is revolubly mounted, of means for rotating the said shaft, of flexible, but inelastic means tightly stretched between the ends of the rack part of the said shutter and the top of the sliding part of the said telescopic tube so as to keep the said shutter open by the weight of the latter when lowered into its charging position, of an upright movable lockbar, of a stationary guide tube for the same, of gearing fitted to the said lockbar, of gearing mounted on the above named shaft and adapted to work the latter gearing in such a manner that, when the said shutter is closed, the said lockbar is in its high position out of the way of the said balance and its appendages, of a lockseat adapted to receive the said lockbar, when lowered, and mounted on the said truck at such a point as thereby to lock it, when the charging opening of the said balance thereon is in alignment with the said charging tube, of a pawl fitted in the said lockbar, of a seat for the said pawl to catch in when the said lockbar is in the said high position, of a tripblock arranged at the said truck and capable of releasing the said pawl when encountering it, of a conveyer for transferring the material from the said bin into the said telescopic charging tube, of an electromotor driving the said conveyer, of a push button starter arranged to start the said motor and fixed to the said gate valve frame, and of a device capable of actuating the said starter and mounted on the said shutter at such a point that the said motor is started as soon as the said shutter, unlocked from its closed position by the release of the said pawl by means of the said tripblock and drawn open by the descent of the sliding part of the said telescopic tube, has been completely opened, while at the same time the said truck has been locked in its proper position for charging by the said lockbar descending into the said lockseat.

19. In a machine of the kind described, in combination with a balance comprising a furcated scale beam, the stem of which is adapted to receive the weights, and a weighing hopper suspended between the branches of the scale beam, a disc mounted on the top of the stem of the latter, a truck supporting the fulcrum of the said balance, rails for the said truck to run on, a chute for charging the same, a gate valve frame fixed to the said chute, a shutter sliding in the said frame, means for opening and closing the said shutter, a conveyer transporting the material to be weighed to the said chute, an electromotor driving the said conveyer, a push button starter fixed to the said gate valve frame, a device capable of actuating the said starter and arranged on the said shutter at such a point that the said motor is started, as soon as the said shutter has been opened, a switch placed vertically above the said disc on the scale beam in the electric circuit to the said motor, a triprod suspended from the said switch, keeping it closed by its weight, when undisturbed, and being of such a length, that, when the weighing hopper of the said balance has received the required quantity of material, the rising stem of the said scale beam lifts the triprod and thus, breaking the circuit, stops the motor.

20. In a machine of the kind described, in combination with a balance comprising a furcated scale beam, the stem of which is adapted to receive the weights, and a weighing hopper suspended between the branches of the scale beam, a disc mounted on the top of the stem of the latter, a truck supporting the fulcrum of the said balance, rails for the said truck to run on, a plurality of bins containing the materials to be weighed, and for each bin: a telescopic charging tube consisting of an upper stationary part and a heavy lower part sliding on the lower half of the latter, of a gate valve frame provided in the upper half of the stationary part of the said telescopic tube, of a shutter sliding therein, of flexible, but inelastic means tightly stretched between the said shutter and the top of the sliding part of the said telescopic tube in such a manner that the former is kept open by the weight of the latter, when lowered into the charging position, of means for closing the said shutter, of means for locking the same in this position, of a conveyer for transferring the material from the said bin into the said telescopic charging tube, of an electromotor driving the said conveyer, of a push button starter arranged in the electric circuit to the motor for starting the same and fixed to the said gate valve frame, of a device capable of actuating the said starter and mounted on the said shutter at such a point, that the motor is started as soon as the said shutter has been opened by the descent of the released sliding part of the said telescopic tube, a switch arranged vertically above the said disc on the said scale beam, a triprod suspended by a small plate from the said switch, keeping the same, when undisturbed, closed by its weight, and being of such a length that, when the weighing hopper of the said balance has received the required weight, the rising stem of the said scale beam lifts the triprod and, thus breaking the current, stops the motor.

21. In a machine of the kind described, in combination with a balance comprising a furcated scale beam, the stem of which is adapted to receive the weights, and a weighing hopper suspended between its branches, a disc mounted on top of its stem, a truck supporting the fulcrum of the said balance, rails for the said truck to run on, a chute for charging the same, a shutter provided therein, means for opening and closing the said shutter, a conveyor supplying the material to be weighed to the said chute, an electromotor driving the said conveyer, an automatic switch arranged in the electric circuit for starting the said motor and actuated by a device fixed to the said shutter in such a manner, that, as soon as the latter has been opened, the conveyer begins to work, a switch placed in the electric circuit vertically above the said disc on the scale beam, a small plate arranged to keep the said switch closed while resting on the same, a small rod fixed to the underside of the said small plate, a housing enclosing the said switch and small plate and provided in its bottom vertically above the said disc with a stuffing box for the said small rod to slide in, and a triprod hinged to the latter, both being of such length, that, when the said scale beam is raised by the said weighing hopper having received the required quantity of material, the said disc raises the triprod and the small plate and, thus breaking the current, stops the said conveyer.

22. In a machine of the kind described, in combination with a balance comprising a furcated scale beam, the stem of which is adapted to receive the weights, and a weighing hopper suspended between its branches, a truck supporting the fulcrum of the said balance, rails for the said truck to run on, a chute for charging the same, a shutter provided in the said chute, means for opening and closing the said shutter, a conveyer supplying the material to be weighed to the said chute, an electromotor driving the said conveyer, an automatic switch arranged in the electric circuit for starting the said motor and actuated by a device fixed to the said shutter in such a manner, that, as soon as the latter has been opened, the conveyer is started, a second automatic switch arranged in the electric circuit for stopping the said motor and actuated by a device fixed to the stem of the said scale beam in such a manner, that, as soon as the latter rises in consequence of the said weighing hopper having received the required quantity of material, the conveyer is stopped, and a third switch arranged in the electric circuit at a convenient place for the operator of the machine for controlling the two other switches and adapted to cut out the said motor simultaneously with the opening of the second switch.

23. In a machine of the kind described, in combination with a balance comprising a furcated scale beam and a weighing hopper suspended between its branches, of a truck supporting the fulcrum of the said balance, of rails for the said truck to run on, of a telescopic chute for charging the same, of a shutter provided in the said chute, of means for opening and closing the same, of automatic means actuated by a device mounted on the said truck for arresting the same when the weighing hopper of the said balance thereon is in the proper position to the said chute for being charged, of a bin containing the material to be weighed and consisting of an oblong upper part, of a narrow half cylindrical bottom part of the same length as the former and of a middle part connecting the two other parts, of a power driven conveyer arranged to transfer the material from the said bin to the said chute and extending throughout the whole length of and coaxially to the bottom part of the said bin and beyond the same into a chute-like prolongation of the said bottom part connected at the edge of its open bottom to the said telescopic chute, of an electromotor for driving the said conveyer, of an automatic device arranged at the said shutter for starting the said conveyer as soon as the said shutter has been opened, and of an automatic device for stopping the said conveyer by means of the rising stem of the scale beam, when its weighing hopper has received the required quantity of material.

24. In a machine of the kind described, in combination with a balance comprising a furcated scale beam and a weighing hopper suspended between its branches, a disc mounted on the stem of the said scale beam, a truck supporting the fulcrum of the said balance, a lockseat and trip block arranged on the side beams of the said truck, a track of rails for the latter to run on, means for moving the said truck, any number of machines placed underneath the said track of rails to receive the weighed materials, a plurality of bins containing the materials to be weighed, and for each bin: a telescopic chute arranged for charging the said weighing hopper and consisting of a stationary upper tube and a heavy lower tube sliding on the lower part of the latter, a shutter provided in the upper half of the said stationary tube, flexible, but inelastic means tightly stretched between the ends of the said shutter and the top of the said sliding tube in such a manner that the former is kept open by the weight of the latter when lowered into the said weighing hopper for charging, an upright movable lockbar, a stationary guide tube for the latter to slide in, a pawl mounted in the said lockbar, a slot cut in the said guide tube for the said pawl to catch in, when the said lockbar is in its high position out of the way of the said truck and balance, gearing fixed to the said shutter, gearing meshing with the same, gearing fitted to the said lockbar, gearing meshing with the same, stationary supports, a shaft revolubly mounted in the said stationary supports and having affixed thereto both the said gearings in such a position to each other that, when the said shutter has been closed, the said pawl catches in the said slot and locks the same, means for rotating the said shaft, a conveyer transferring the material to be weighed from the said bin to the said telescopic chute, an electromotor for driving the said conveyer, a push button starter arranged on the frame of the said shutter, an actuating device mounted on the latter at such a point that, when the released shutter is opened by the descending sliding tube, the said motor is started, a switch arranged vertically above the said disk in the electric circuit to the said motor, and a triprod suspended vertically from a small plate resting on the said switch and keeping it closed while undisturbed, and being of such a length, that, when the stem of the said scale beam rises in consequence of the said weighing hopper having been duly charged, the said disc raises the said triprod and its plate and, thus breaking the current, stops the motor, the said lock bar and its pawl being so situated in regard to the said trip block and lockseat on the said truck, that, when the said trip block, encountering the said pawl, releases the said lockbar, the latter, dropping into the said lockseat, keeps the said weighing hopper in the proper position for being charged from the said telescopic chute, while at the same time the sliding tube of the latter descends, the said shutter is opened thereby and the conveyer started.

EUGENE GASE.